United States Patent [19]

Ikawa et al.

[11] Patent Number: 5,176,006
[45] Date of Patent: Jan. 5, 1993

[54] AIR-CONDITIONER WITH INSTALLATION POSITION DETECTION OUTPUT COMPENSATING TEMPERATURE

[75] Inventors: Shingo Ikawa, Fujinomiya; Mitsuhiro Mochizuki, Fuji, both of Japan

[73] Assignee: Kabushiki Kaisha Toshiba, Kawasaki, Japan

[21] Appl. No.: 826,881

[22] Filed: Jan. 28, 1992

[30] Foreign Application Priority Data

Jan. 30, 1991 [JP] Japan ................... 3-029375
May 22, 1991 [JP] Japan ................... 3-117561

[51] Int. Cl.⁵ .................................. F24F 11/00
[52] U.S. Cl. .................................. 62/125; 62/126;
62/161; 62/163; 62/259.1; 62/298; 236/51;
165/24; 165/25
[58] Field of Search .................. 62/161, 163, 125, 126,
62/259.1, 298, 77; 236/51; 165/24, 25

[56] References Cited

U.S. PATENT DOCUMENTS

| | | | |
|---|---|---|---|
| 4,509,586 | 4/1985 | Watabe | 62/163 |
| 4,671,458 | 6/1987 | Fukuda et al. | 236/49 |
| 4,966,009 | 10/1990 | Ishii et al. | 62/161 |
| 4,982,582 | 1/1991 | Susumu | 62/161 |

FOREIGN PATENT DOCUMENTS

| | | | |
|---|---|---|---|
| 0186159 | 8/1987 | Japan | 236/51 |
| 63-271052 | 11/1988 | Japan | |

Primary Examiner—John K. Ford
Attorney, Agent, or Firm—Foley & Lardner

[57] ABSTRACT

The position where an indoor unit is actually installed is manually instructed by an installation position confirmation element. A temperature correction value selector selects and outputs, from a Table prepared in advance, a temperature correction value ($\Delta T_s$) in dependency upon the installation position confirmed by the installation position confirmation element in order to compensate a temperature difference which can exist between a temperature at a position to be mainly air-conditioned of a room and a temperature at the position where the indoor unit is installed, i.e., at the position where a room temperature is sensed. Thus, a set temperature ($T_s$), a room temperature ($T_a$), or a difference ($T_s - T_a$) therebetween is corrected by the temperature correction value ($\Delta T_s$).

12 Claims, 9 Drawing Sheets

AIR-CONDITIONER WITH INSTALLATION POSITION DETECTION OUTPUT COMPENSATING TEMPERATURE

FIELD OF THE INVENTION

This invention relates to an air-conditioner in which a refrigerating cycle is operated so that a difference between a set temperature set by a temperature setter and a room temperature sensed by a temperature sensor attached at an indoor unit.

BACKGROUND ART

There are many instances where an indoor unit of a split-type air-conditioner used in ordinary home is installed, e.g., at the upper part of a side wall because a central area or space within a room when viewed three-dimensionally or an area or space slightly below the central area is allowed to be mainly air-conditioned. In that case, a temperature sensor for sensing a room temperature is provided in the vicinity of an interior air inlet of the indoor unit.

Meanwhile, so called a free built-in type air-conditioner which can be installed in the state where such an air-condition is embedded not only in a wall portion, but also is embedded at/in any other portions such as a ceiling portion or a cupboard or closet near the ceiling, etc. is proposed as an air-conditioner for ordinary home. An air-conditioner of this type is composed of an indoor unit and an outdoor unit. More particularly, the indoor unit is comprised of a blower unit and a heat exchanger unit wherein the blower unit and the heat exchanger unit are connected through a duct. Accordingly, when the positions of the inlet and the blow-off opening for interior air are determined, the installion positions of the blower unit and the heat exchanger unit in correspondence with those positions are determined.

In a free built-in type air-conditioner of this kind, a temperature sensor for the indoor unit is provided in the vicinity of the air inlet. Accordingly, in dependency upon the installation position of the indoor unit, the temperature sensor senses an air temperature in the vicinity of the upper part of a side wall, or senses an air temperature of a space close to a cupboard or closet on the floor. As well known, an air within a room is circulated to some extent by air-conditioning, so temperatures at respective portions within the room are caused to become uniform to some degree. However, in practice, there is a considerably large difference between a temperature at the portion in the vicinity of the ceiling and a temperature of a space near the cupboard on the floor. For this reason, there exists a temperature difference which cannot be neglected between a temperature at a central portion of a room which is the position to be mainly air-conditioned and a temperature at the position where the temperature sensor is provided.

Hitherto, since any measure was not taken for such a temperature difference, for example, in the case where an indoor unit is installed on the ceiling, there were instances where heating at the central portion of a room becomes insufficient in a heating operation, or a central portion of a room becomes too cool in a cooling operation.

SUMMARY OF THE INVENTION

Accordingly, an object of this invention is to provide an air-conditioner, which is capable of allowing a temperature at a position to be mainly air-conditioned such as a central portion, etc. of a room to becomes equal to a set value as close as possible irrespective of the position within a room where an indoor unit is installed.

In order to achieve this object, an air-conditioner according to this invention comprises installation position confirmation means operated or manipulated so as to generate a signal indicative of an installation position in dependency upon the position where an indoor unit is installed, and temperature correction means for correcting one of a set temperature, a room temperature, and a temperature between the set temperature and the room temperature by a temperature correction value for compensating a temperature difference which can exist between a temperature at the position to be mainly air-conditioned and a temperature at an installation position of the indoor unit in dependency upon an installation position confirmed by the installation position confirmation means.

Furthermore, an air-conditioner according to this invention, in which a refrigerating cycle is operated so that a difference between a set temperature set by a wireless remote controller and a room temperature sensed by a temperature sensor attached at an indoor unit, wherein the control system comprises: signal receiving means attached at the indoor unit, and adapted to receive an output signal from the wireless remote controller and to output a signal corresponding to a receiving direction; installation position discrimination means for discriminating an installation position of the indoor unit on the basis of an output from the signal receiving means; and temperature correction means for correcting one of a set temperature, a room temperature, and a difference between the set temperature and the room temperature by a temperature correction value for compensating a temperature difference which can exist between a temperature at a position to be mainly air-conditioned within a room and a temperature at an installation position of the indoor unit in dependency upon an installation position discriminated by the installation position discrimination means.

Preferably, the air-conditioner further comprises temperature shift means for shifting a temperature correction value in dependency upon the state within a room subject to air-conditioning.

BRIEF DESCRIPTION OF THE DRAWINGS

In the accompanying drawings.

PREFERRED EMBODIMENTS OF THE INVENTION

Figure 1:
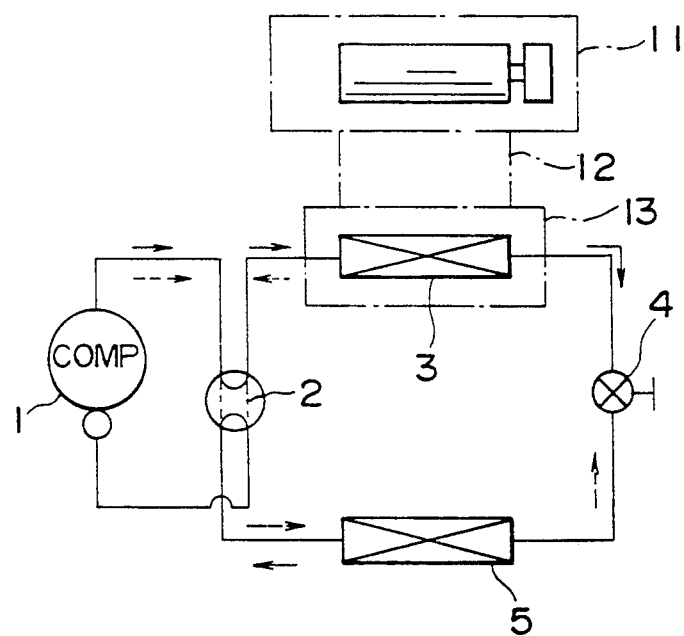
FIG. 1 shows a refrigerating cycle of an air-conditioner to which this invention is applied.

FIG. 1 shows a refrigerating cycle of a free built-in type air-conditioner according to a first embodiment of this invention. At the time of a heating operation (arrow indicated by the solid lines), refrigerant circulates through a path including a compressor 1, a four-way valve 2, an indoor heat exchanger 3, an expansion valve 4, an outdoor heat exchanger 5, the four-way valve 2, and the compressor 1. On the contrary, at the time of a cooling operation (arrow indicated by broken lines), refrigerant circulates through a path including the compressor 1, the four-way valve 2, the indoor heat exchanger 5, the expansion valve 4, the indoor heat exchanger 3, the four-way valve 2, and the compressor 1. The indoor heat exchanger 3 and the outdoor heat exchanger 5 are provided with blower units for promoting heat exchange, respectively. In this figure, only a blower unit 11 for the indoor heat exchanger 3 related to this invention is shown. The heat exchanger unit 13 including the indoor heat exchanger 3 and the blower unit 11 are connected through a duct 12. These components constitute an indoor unit referred to in this invention. Namely, by the blower unit 11, the duct 12 and the heat exchanger unit 13, the indoor unit is constituted.

Figure 2:
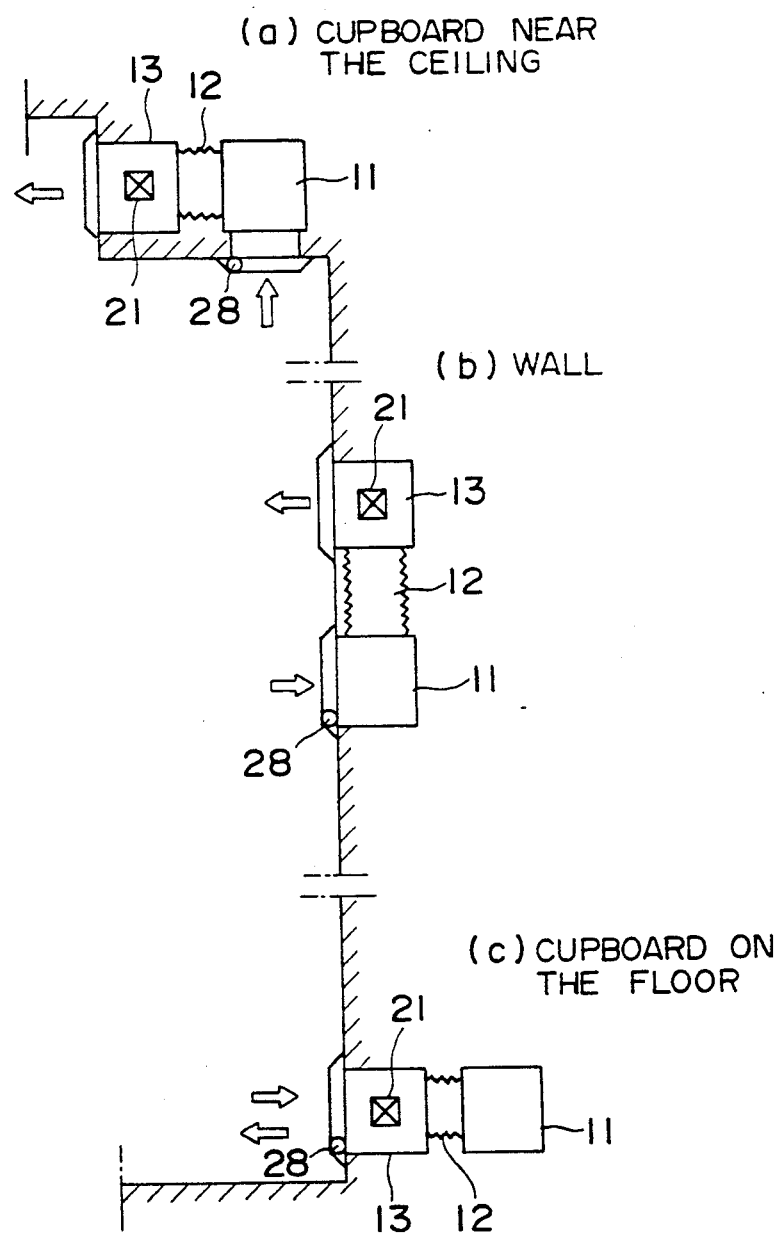
FIG. 2 is a view showing various installation positions of an indoor unit in the air-conditioner of FIG. 1.

FIG. 2 shows an example of installation positions of the indoor unit. In FIG. 2, (a) shows the situation where the indoor unit is installed in a cupboard near the ceiling, (b) shows the situation where it is installed in a wall portion (central portion), and (c) shows the situation where it is installed in a cupboard on the floor. In this case, air within a room is sucked as indicated by arrow from the blower unit 11, and is guided into the heat exchanger unit 13 through the duct 12, at which it is heat-exchanged. The air thus heat-exchanged is blown out into the room for a second time. It is to be noted that in the case where the indoor unit of FIG. 2(c) is installed in the cupboard on the floor, the blower unit 11 is installed at a deep place within the wall, and the blower unit 11 and the air inlet of the heat exchanger unit 13 are connected through the duct 12. Air within a room is sucked by the blower unit 11, and is then blown out from the heat exchanger unit 13 through the duct 12 into the room. Irrespective of the installation positions of (a), (b) and (c), a temperature sensor 28 for sensing a room temperature is provided in the vicinity of the air inlet of the indoor unit and an installation position confirmation switch 21 is provided in the heat exchanger unit 13.

Figure 3:
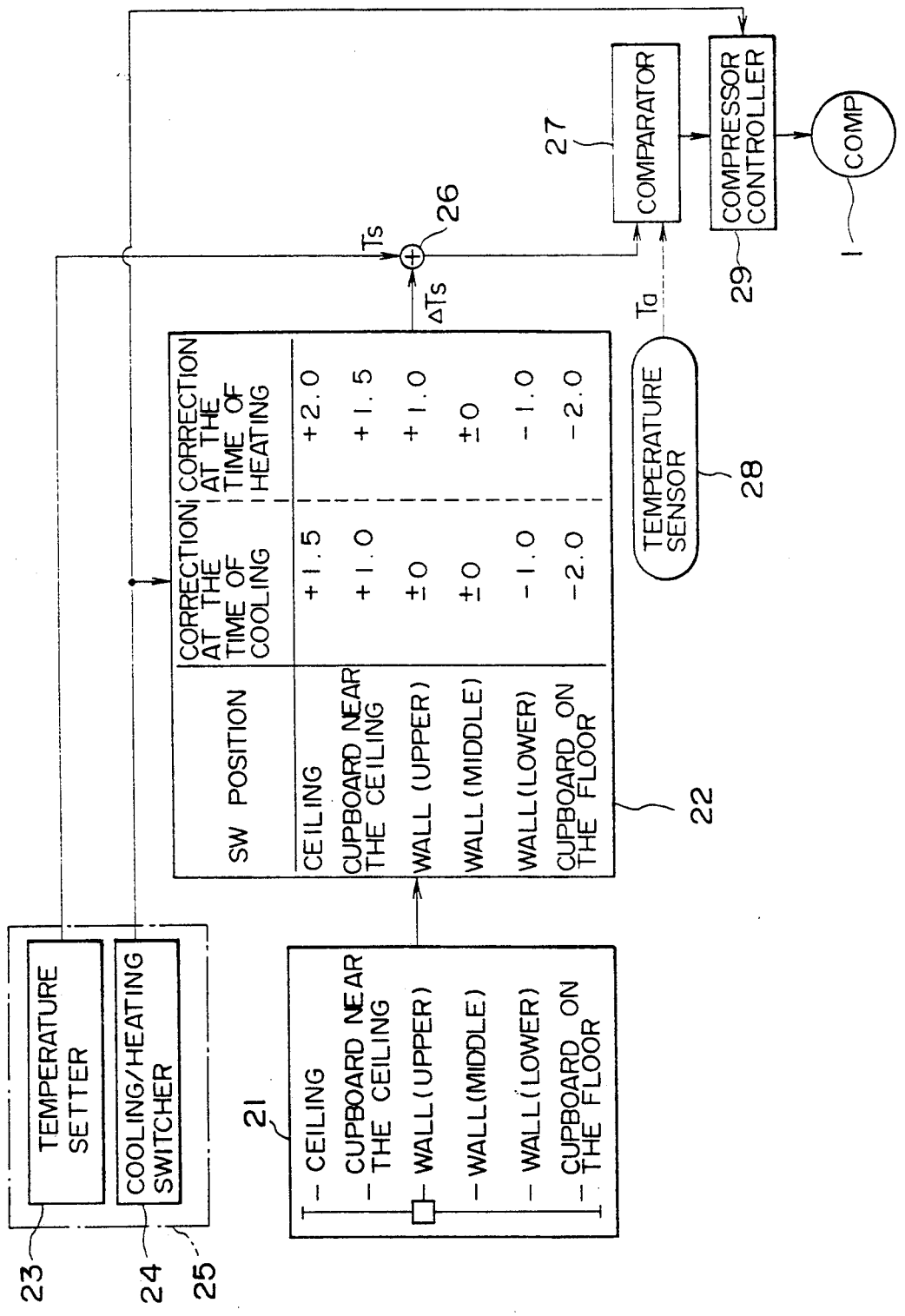
FIG. 3 is a block diagram showing a control system according to a first embodiment of this invention.

FIG. 3 is a block diagram showing a control system of this embodiment. The installation position confirmation switch 21 is provided in association with the heat exchanger unit 13, and is manually switched and set as respective positions switched and set are indicated in correspondence with the positions where the indoor unit is actually installed. It is to be noted that while the indoor unit constituted by the blower unit 11, the duct 12 and the heat exchanger unit 13 is installed at any one of the cupboard near the ceiling, the wall and the cupboard on the floor as shown in FIG. 2, it may be installed on the ceiling as described later. In addition, a convenient place of an upper portion, a middle portion or a lower portion of the wall may be selected.

A temperature correction value selector 22 is connected to the installation position confirmation switch 21. The temperature correction value selector 22 stores therein the content instructed by the installation position confirmation switch 21 and a temperature correction value corresponding thereto in the form of a Table according to the operation mode (whether the air-conditioner is in a heating operation or in a cooling operation). This temperature correction value selector 22 judges an installation position of the indoor unit from the state instructed by the installation position confirmation switch 21, and selectively outputs, in accordance with that installation position and an operation mode signal which will be described later, a temperature correction value $\Delta T_s$ for compensating a temperature difference between a temperature at the central portion of the room subject to air-conditioning and a temperature at an installation position of the indoor unit to which the temperature sensor 28 is attached. The temperature correction value Table included in the temperature correction value selector 22 is experimentally determined by taking into consideration shape of a room or an arrangement state of furniture, etc. At the temperature correction value selector 22 of FIG. 3, an example of a Table thus obtained is shown. On the other hand, in order to carry out remote control of the air-conditioner, a remote controller 25 including a temperature setter 23 and a cooling/heating switcher 24 is provided. A temperature set value $T_s$ set by the temperature setter 23 is applied to an adder 26, and an operation mode signal from the cooling/heating switcher 24 is applied to the temperature correction value selector 22 and a compressor controller 29.

The adder 26 adds the temperature correction value $\Delta T_s$ to the temperature set value $T_s$ to form a corrected temperature set value $(T_s + \Delta T_s)$ to deliver it to a comparator 27. A temperature sense value $T_a$ from the temperature sensor 28 is also applied as a second input signal to the comparator 27. A signal corresponding to a difference $(T_s + \Delta T_s - T_a)$ between the temperature sensed value $T_a$ and the corrected temperature set value $(T_s + \Delta T_s)$ is sent to the compressor controller 29 together with the operation mode signal from the cooling/heating switcher 24. The compressor controller 29 controls the speed of the compressor 1 on the basis of both input signals. In practical sense, respective functions of the temperature correction value selector 22, the adder 26, the comparator 27 and the compressor controller 29 are performed by a common microcomputer.

A temperature set by using the temperature setter 23 corresponds to a temperature at a substantially spatially central position of a room, and a temperature correction value $\Delta T_s$ for compensating a difference between a temperature at its central position and a temperature at an installation position of the indoor unit (room temperature sense position) is used. Namely, the compressor 1 is controlled by the compressor controller 29 so that the value expressed as $T_s + \Delta T_s - T_a$ becomes equal to zero. In other words, the control of the compressor 1 by the compressor controller 29 is carried out by the following three ways of temperature correction: In the first way, a control is carried out such that $T_a = T_s + \Delta T_s$, i.e., a temperature sensed value $T_a$ becomes close to a corrected temperature set value $(T_s + \Delta T_s)$. In the second way, a control is carried out such that $T_a - \Delta T_s = T_s$, i.e., a value obtained by subtracting the temperature correction value $\Delta T_s$ from the temperature sensed value $T_a$ becomes close to the temperature set value $T_s$. In the third way, a control is carried out such that $(T_s - T_a) + \Delta T_s$, i.e., a value obtained by adding the temperature correction value $\Delta T_s$ to a difference between the temperature set value $T_s$ and the temperature sensed value $T_a$ becomes close to zero. In FIG. 3, the first way of temperature correction is illustrated.

Figure 4:
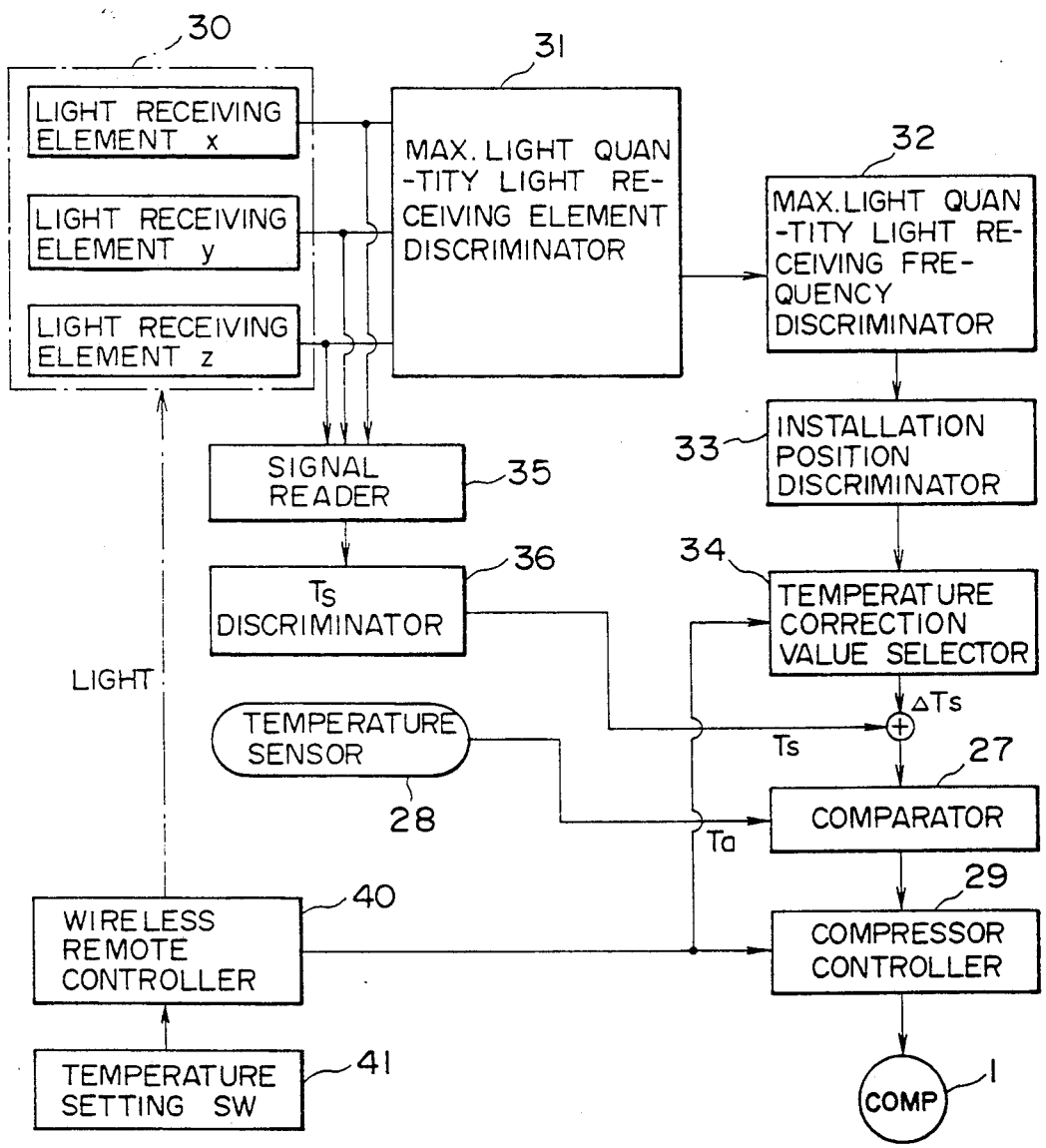
FIG. 4 is a block diagram showing a control system according to a second embodiment of this invention.
Figure 5A:
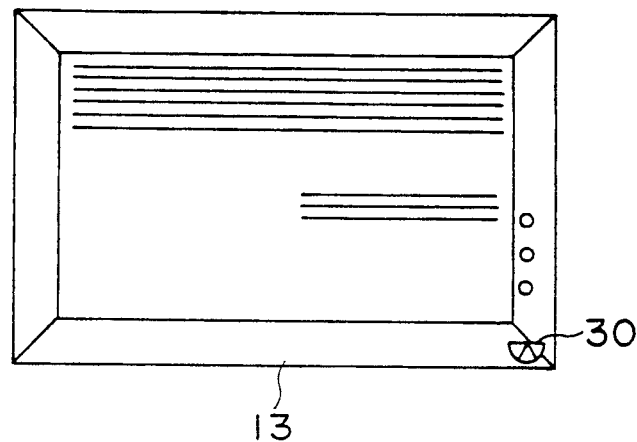
FIGS. 5A and 5B are a front view of an indoor unit and a front view of a multi-element light-receiver in the second embodiment of this invention, respectively.
Figure 5B:
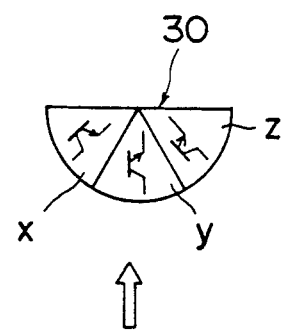

FIG. 4 is a block diagram showing a control system according to a second embodiment of this invention wherein components to which the same reference numerals as those of FIG. 3 are attached represent the same components, respectively. In this embodiment, a multi-element light receiving device or photodetector 30 provided as signal receiving means is arranged at the corner of the front panel of the heat exchanger unit 13, and is capable of receiving or detecting a light signal from a wireless remote controller 40 having a temperature setting switch 41. This multi-element photodetector 30 consists of a plurality of (three in the case shown) of light receiving elements, i.e., photodetection elements x, y and z as shown in FIG. 5B. By making use of the fact that quantities of light received of light receiving elements x, y and z vary in dependency upon the installation position of the heat exchanger unit 13, the multi-element photodetector 30 automatically discriminates at which portion of a room the heat exchanger unit 13 is actually installed. In addition, a maximum light quantity photodetection element discriminator 31 for discriminating which photodetection element of the photodetection elements x, y and z detects a maximum light quantity is connected to the multi-element photodetector 30.

Meanwhile, the wireless remote controller 40 is not necessarily operated or manipulated at a fixed position within a room, but it may be operated or manipulated at various positions according to an operators, or room circumstances. For this reason, even if the position of the multi-element photodetector 30 is fixed, which photodetection element of the photodetection elements x, y and z detects a maximum light quantity is not necessarily fixed. However, it has been experimentally confirmed from a statistical point of view that an incident direction of a light signal from the wireless remote controller 40 detected by the multi-element photodetector 30 fixedly arranged has a substantially fixed tendency as if the wireless remote controller 40 is substantially fixedly arranged.

Figure 6:
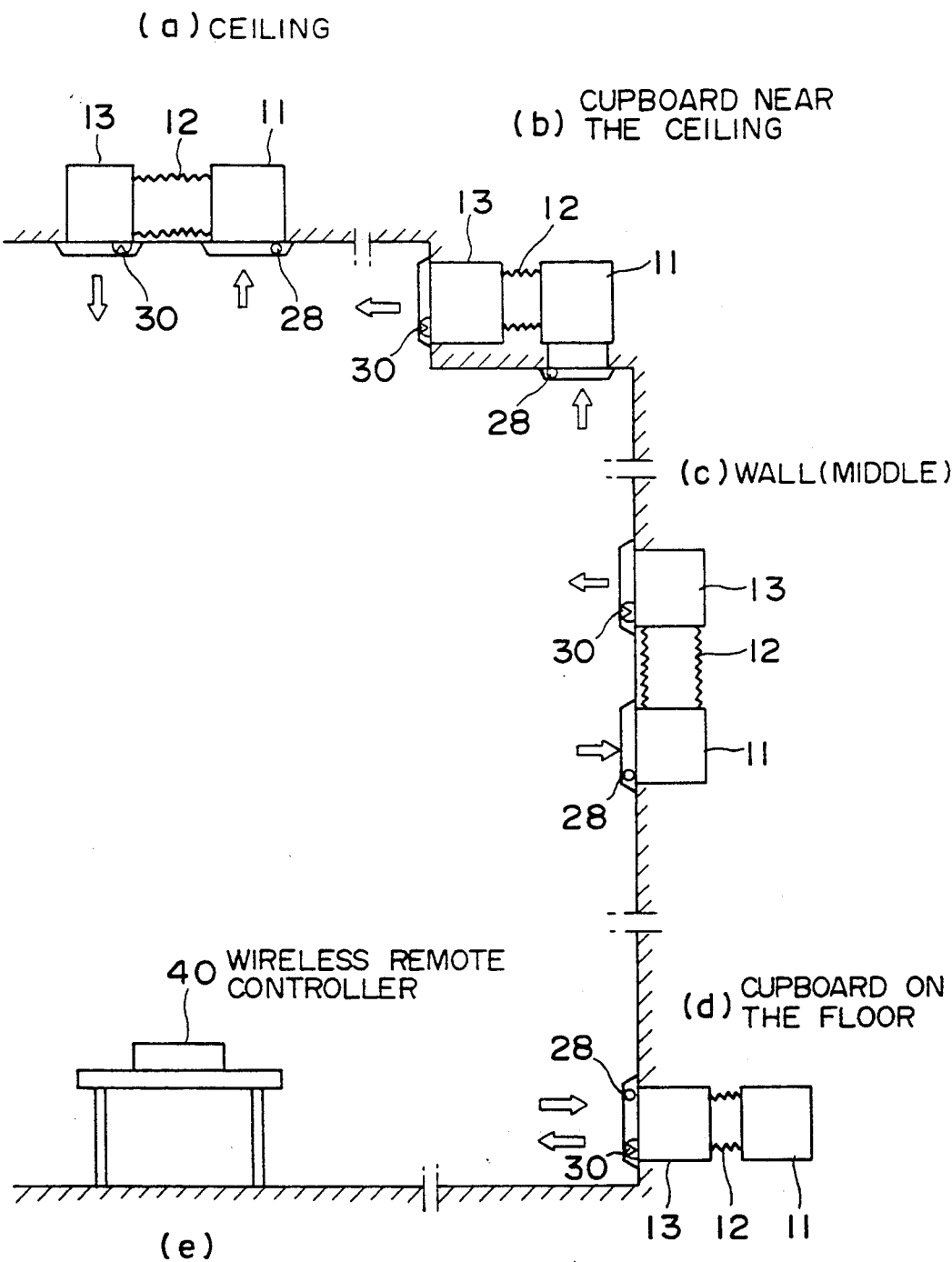
FIG. 6 is a view showing various installation positions of an indoor unit.

Now, as indicated by (a) to (d) of FIG. 6, it is assumed that the indoor unit is installed at the ceiling portion, the cupboard near the ceiling, the wall (middle) portion, or the cupboard on the floor, that the multi-element photodetector 30 is attached on the front panel of the heat exchanger unit 13, and the wireless remote controller 40 is mounted on a table placed at the central portion within a room. In this case, even if different operators operate the wireless remote controller 40 under various circumstances, the statistical results relating to frequency indicating which photodetection element of the photodetection elements x, y and z detects a maximum light quantity are obtained as shown in FIGS. 7A, 7B, 7C and 7D.

Figure 7A:
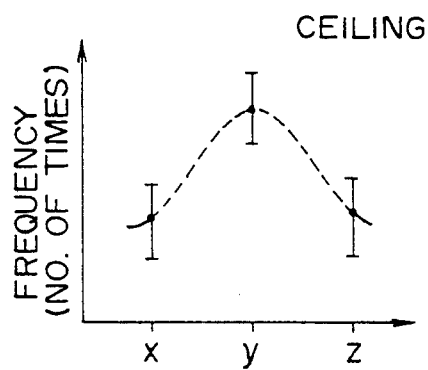
FIGS. 7A, 7B, 7C and 7D are graphs showing the relationship between light-receiving elements and a maximum light quantity light receiving frequency in various installation positions of an indoor unit.
Figure 7B:
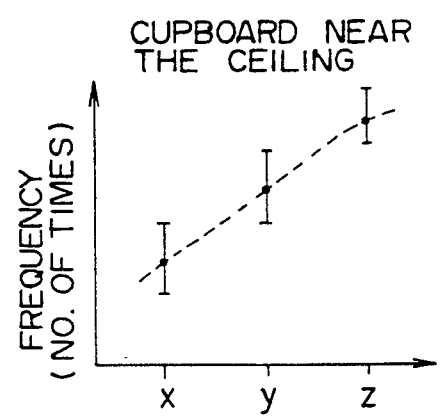
Figure 7C:
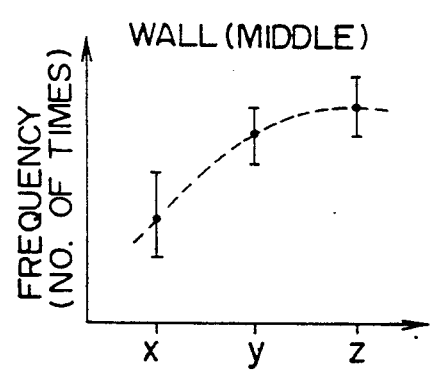
Figure 7D:
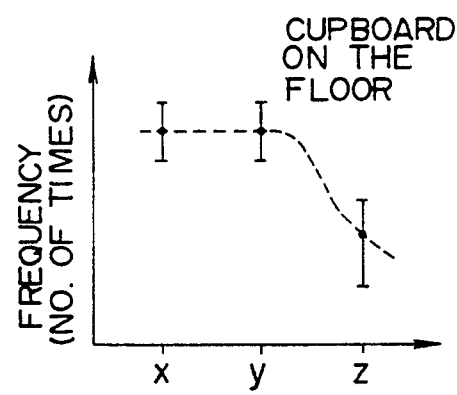

Namely, in the case where the indoor unit is installed at the ceiling portion, as shown in FIG. 7A, the frequency that the photodetection element y at the central portion indicates a maximum quantity of light received is the highest, whereas the frequencies that the photodetection elements x and y indicate a maximum quantity of light received are low. Further, in the case where the indoor unit is installed at the cupboard near the ceiling, as shown in FIG. 7B, the frequency that the photodetection element z indicates a maximum quantity of light received is the highest, the frequency that the photodetection element y indicates a quantity of light received is high next to the frequency of the maximum quantity of light received by the photodetection element z, and the frequency that the photodetection element x indicates a maximum quantity of light received is the lowest. In a manner similar to the above, in the case where the indoor unit is installed at the wall (middle) portion, as shown in FIG. 7C, the frequency distribution is similar to that in the case where the indoor unit is installed at the cupboard near the ceiling (FIG. 7B), but differs from the case of FIG. 7 in that a difference between the frequency that the photodetection element y indicates a maximum quantity of light received and the frequency that the photodetection element z indicates a maximum quantity of light received is smaller than that in the case of FIG. 7B. In addition, in the case where the indoor unit is installed at the cupboard on the floor, as shown in FIG. 7D, the frequencies that the photodetection elements x and y indicate a maximum quantity of light received are high, and the frequency that the photodetection element z indicates a maximum quantity of light received is low.

In view of this, on the basis of a discriminated result of a maximum light quantity photodetection element discriminator 31, the maximum light quantity photodetection frequency discriminator 32 discriminates the maximum light quantity photodetection frequency every respective photodetection elements. When the number of statistical data obtained as the discriminated result becomes equal to, e.g., 50, an installation position discriminator 33 discriminates the installation position of the indoor unit on the basis of the statistical tendency of FIGS. 7A to 7D. In dependency upon the result of the discriminated installation position and an operation mode signal from the wireless remote controller 40, a temperature correction value selector 34 outputs a temperature correction value $\Delta T_s$. In this embodiment, a signal reader 35 for reading a signal transmitted from the wireless remote controller 40 is connected to the multi-element photodetector 30. Thus, a temperature set value ($T_s$) discriminator 36 outputs a room temperature set value $T_s$ on the basis of the signal thus read. At times subsequent thereto, in the same manner as in the case of FIG. 3, the adder 26 adds the temperature set value $T_s$ and the temperature correction value $\Delta T_s$ to output a corrected temperature set value ($T_s + \Delta T_s$). Thus, the comparator 27 makes a comparison between the corrected temperature set value ($T_s + \Delta T_s$) and a temperature sensed value $T_a$ sensed by the temperature sensor 28 to deliver a signal corresponding to a difference ($T_s + \Delta T_s - T_a$) therebetween to the compressor controller 29. An operation mode signal is also delivered from the wireless remote controller 40 to the compressor controller 29.

In practice, respective functions of the maximum light quantity photodetection element discrimination 31, the maximum light quantity photodetection frequency discriminator 32, the installation position discriminator 33, the temperature correction value selector 34, the signal reader 35, the temperature set value discriminator 36, the adder 26, the comparator 27, and the compressor controller 29 are performed by a microcomputer. The flowchart of the functional section executed by the microcomputer is shown in FIG. 8 in connection with the case of a heating operation mode.

Figure 8:
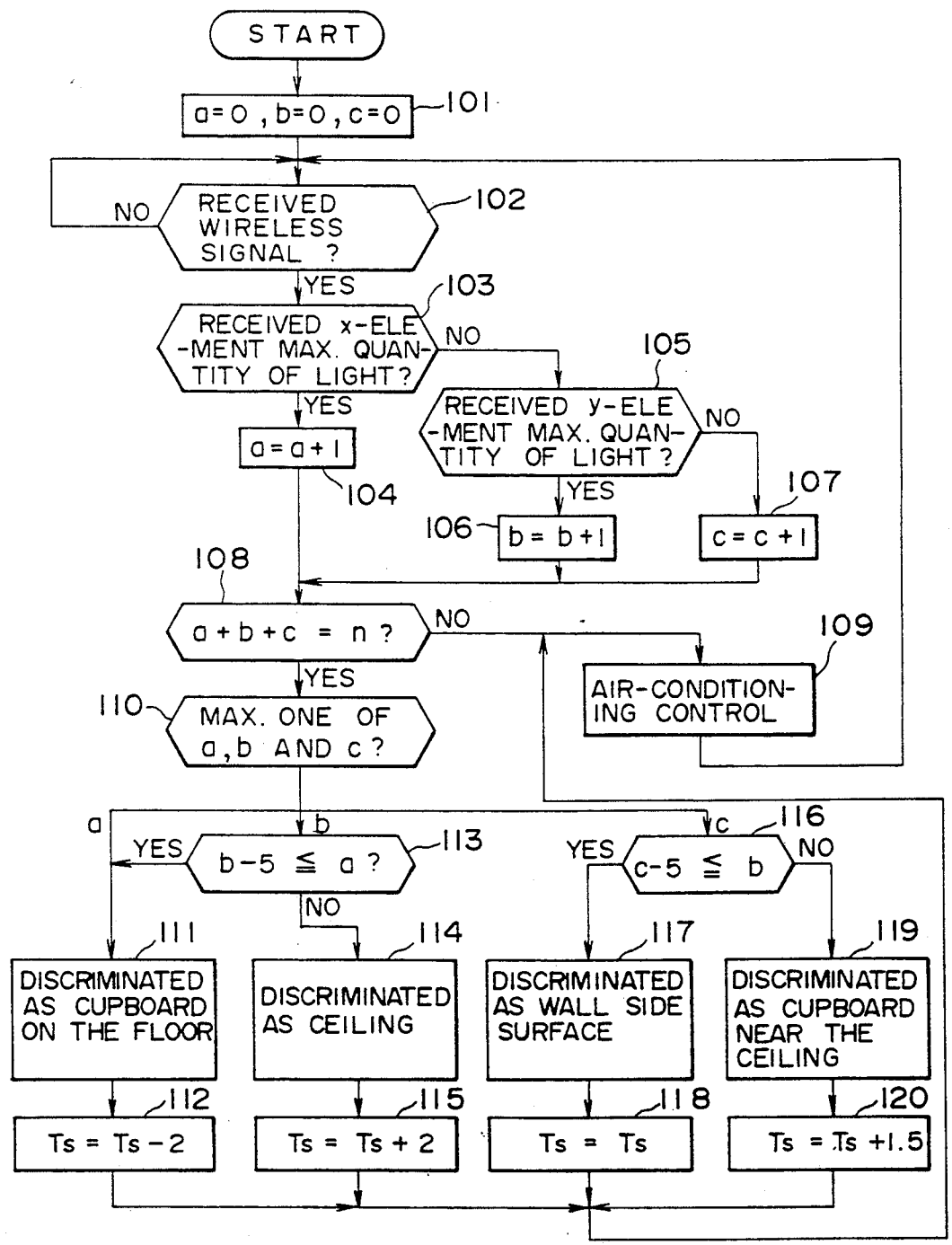
FIG. 8 is a flowchart for explaining the operation of the second embodiment of this invention.

In FIG. 8, assuming that the maximum light quantity photodetection frequencies of the photodetection elements are represented by a, b and c, respectively, at step 101, initially, respective contents of counters for calculating those frequencies are all cleared to "0". Every time reception of a wireless signal is confirmed at step 102, judgment as to whether or not the maximum light quantity photodetection element is the photodetection element x is made at step 103. As a result, when it is judged that the maximum light quantity photodetection element is the photodetection element x, the count content a is incremented by "1" at step 104. In contrast, if the maximum light quantity photodetection element is not the photodetection element x, judgment as to whether or not the maximum light quantity photodetection element is the photodetection element y is made at step 105. As a result, when it is judged that the maximum light quantity photodetection element is the photodetection element y, the count content b is incremented by "1" at step 106. In contrast, when it is judged at the step 105 that the maximum light quantity photodetection element is not the photodetection element y, at step 107, the maximum light quantity photodetection element is judged to be the photodetection element z to increment the count content c by "1". Then, judgment as to whether or not the sum total of the respective count contents a, b and c is equal to n (e.g., 50) is made at step 108. As a result, if the sum total is not equal to n, an ordinary air-conditioning control, i.e., an ordinary control in which no correction is implemented to the temperature set value is carried out. Until the statistical value of n=50 is provided, these processing are repeatedly executed.

When the sum total of the count contents a, b and c becomes equal to n, which count content of the count contents a, b and c is maximum is judged at step 110. As a result, when it is discriminated that the count content a is maximum, it is judged at step 111 that the indoor unit is installed at the position of the cupboard on the floor. Then, the temperature set value $T_s$ is set to a corrected temperature set value ($T_{s-}2$) at step 112 (see FIG. 9). Further, when it is judged that the count content b is maximum, whether or not a difference between the count content b and the count content a is within 5 (five) is discriminated at step 113. As a result, if that difference is within 5, it is also discriminated at step 111 that the indoor unit is installed at the position of the cupboard on the floor to execute the processing at the step 112. On the other hand, when it is judged that the count content b is maximum and a difference between the count content b and the count content a is greater than 5, it is discriminated at step 114 that the indoor unit is installed at the position of the ceiling. As a result, the temperature set value $T_s$ is set to a corrected temperature set value ($T_{s+}2$) at step 115. Further, when it is judged that the count content c is maximum, whether or not a difference between the count content c and the count content b is within 5 is discriminated at step 116. As a result, if that difference is within 5, it is discriminated by the processing at step 117 that the indoor unit is installed at the position of the side wall surface. Thus, the temperature set value $T_s$ is set as the corrected temperature set value as it is at step 118. In addition, it is judged that the count content c is maximum and a difference between the count content c and the count content b is greater than 5, it is discriminated at step 119 that the indoor unit is installed at the position of the cupboard near the ceiling. Thus, a correction value +1.5 is added to the temperature set value $T_s$ at step 120.

It is to be noted that explanation has been simply given for brevity of illustration and description in FIG. 8 in connection with the case the indoor unit is installed at the ceiling, the wall (at the middle portion thereof) or the cupboard on the floor, and the discrimination processing as to whether the indoor unit is installed at the upper part, the middle part, or the lower part of the wall is omitted.

Thus, in accordance with this embodiment, it is possible to discriminate the installation position of the indoor unit in dependency upon the frequency indicating which photodetection element of the photodetection elements x, y and z has detected a maximum light quantity from the remote controller, thus to automatically a room temperature set value in dependency upon the discriminated result.

It is to be noted while the temperature set value is corrected in dependency upon the installation position of the indoor unit in the respective embodiments, the temperature sensed value may be instead corrected by a correction value having the same magnitude as above and a sign opposite to the above as previously described. In short, as long as the temperature correction means is capable of correcting a difference between a temperature set value and a temperature sensed value by a temperature difference between a temperature at a position to be mainly air-conditioned of a room and a temperature at an installation position of a temperature sensor for sensing a room temperature provided in association with the indoor unit, an air-conditioning control similar to the above can be realized.

As described above, in the first embodiment shown in FIG. 3 of the above-described embodiments, the temperature correction value selector 22 selects, from a Table prepared in advance, a temperature correction value $\Delta T_s$ corresponding to a temperature difference between a temperature at a central portion of a room and a temperature at an installation position of the indoor unit. Further, in the second embodiment shown in FIG. 4, the temperature correction value selector 34 selects such a temperature correction value $\Delta T_s$ in the same manner as described above. However, it is to be noted that the correction value Table in the temperature correction value selector 22 or 34 is determined on the assumption that the conditions such as the floor area within a room subject to air-conditioning, the height from the floor to the ceiling, or arrangement of fixtures are standard. Accordingly, in the case where the state of the interior of a room is not standard, it is convenient that the control system is provided with temperature shift means for manually correcting a correction value $\Delta T_s$ selected by the temperature correction value selector 22 or 34.

Figure 9:
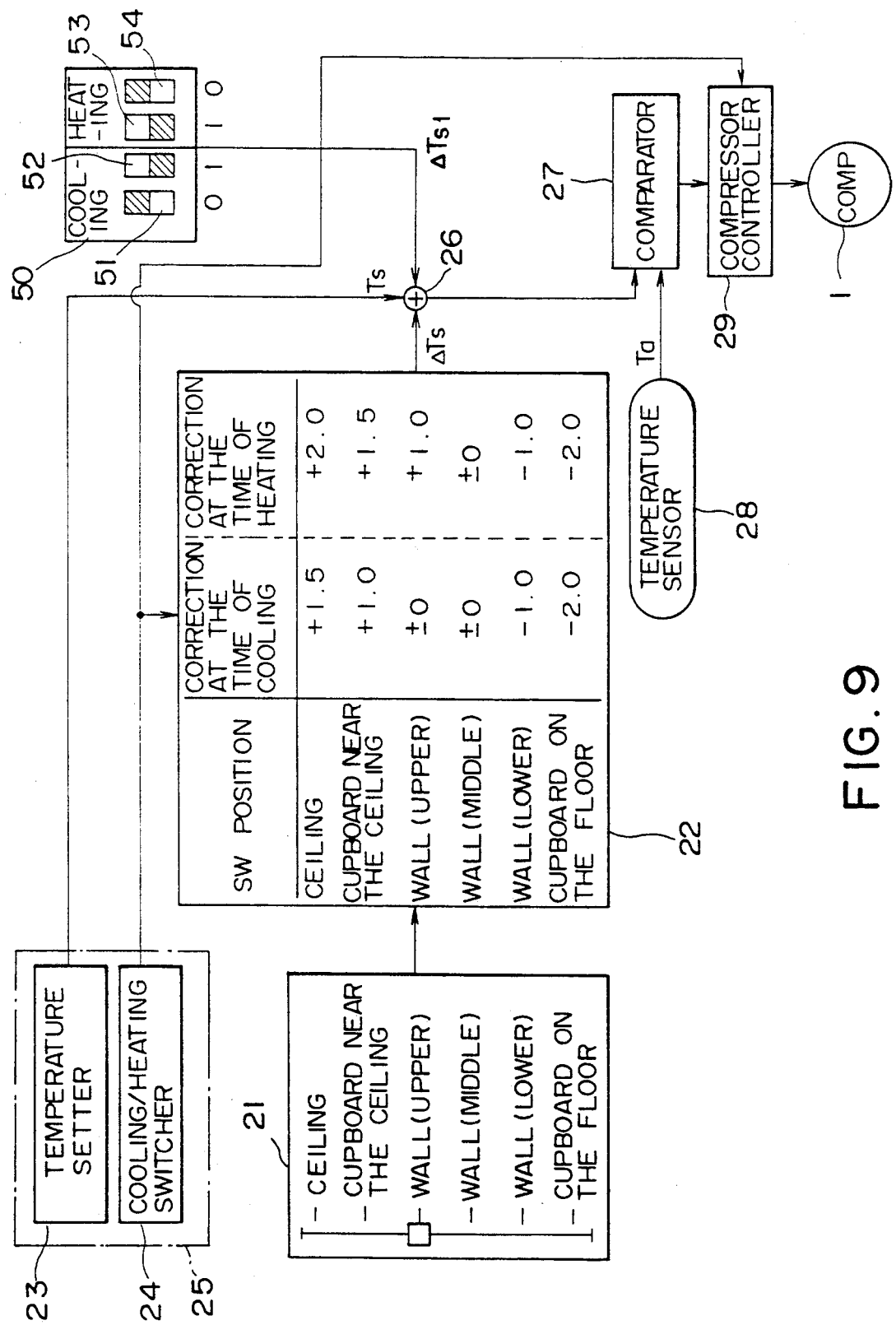
FIG. 9 is a block diagram showing a control system according to a third embodiment of this invention.

FIG. 9 is a block diagram showing a control system of a third embodiment which satisfies this requirement. In this figure, components to which the same reference numerals as those of FIG. 3 are attached represent the same components, respectively. The control system shown in FIG. 9 differs from the control system shown in FIG. 3 in that a temperature shift switch 50 is added, and that an output from the temperature shift switcher 50 is applied to an adder 26. In this embodiment, the temperature shift switcher 50 comprises four ON/OFF switches in total of two ON/OFF switches 51 and 52 for a cooling operation mode and two ON/OFF switches 53 and 54 for a heating operation mode. In respective operation modes, the temperature shift switcher 50 can output four (2×2=4) kinds of temperature correction values $T_{s1}$ in dependency upon ON/OFF states of the respective ON/OFF switches. As four kinds of temperature correction values $T_{s1}$, for example, values of $-1.0$, $\pm 0$, $+1.0$, and $+2.0$ may be taken. The adder 26 adds a temperature set value $T_s$ from the temperature setter 23, a temperature correction value $\Delta T_s$, and a temperature correction value $\Delta T_{s1}$ from the temperature shift switcher 50, thus to output a corrected temperature set value $(T_s + \Delta T_s + \Delta T_{s1})$.

Thus, in accordance with this embodiment, even in the case where the state of a room is not standard, it is possible to allow a temperature at a position to be mainly air-conditioned of a room to be closer to a temperature set value $T_s$ set at the temperature setter 23.

It is to be noted that while the embodiment constructed to correct, by using the temperature shift switcher 50, a temperature difference between a position subject to air-conditioning and a temperature at the installation position of the indoor unit is disclosed, if an approach may be employed to correct a temperature sensed value $T_a$ by the temperature sensor 28 by a correction value $\Delta T_{s1}$ of the temperature shift switcher 50, similar results can be provided in the same manner as in the case of correction of the correction value $\Delta T_s$.

As stated above, it is clear that the technique of providing temperature shift switcher 50 in order to carry out a supplementary correction corresponding to the state of a room can be applied to the case where the installation position is automatically discriminated as in the above-described second embodiment.

What is claimed is:

1. An air-conditioner in which a refrigerating cycle is operated so that a difference between a set temperature set by a temperature setter and a room temperature sensed by a temperature sensor provided at an indoor unit becomes equal to zero, said air-conditioner comprising:
    installation position confirmation means operated or manipulated so as to generate a signal indicative of an installation position in upon the position where said indoor unit is installed, and
    temperature correction means for correcting said set temperature, said room temperature or a difference therebetween by a temperature correction value for compensating a temperature difference which can exist between a temperature at a position to be mainly air-conditioned of a room and a temperature at the position where said indoor unit is installed in dependency upon an installation position confirmed by said installation position confirmation means.

2. An air-conditioner as set forth in claim 1, wherein said indoor unit is comprised of an indoor heat exchanger unit and a blower unit.

3. An air-conditioner as set forth in claim 1, wherein said temperature correction means includes a Table for determining said temperature correction value on the basis of an operation mode signal indicative of a cooling operation or a heating operation, and an output signal from said installation position confirmation means.

4. An air-conditioner as set forth in claim 3, wherein said temperature setter is included in a remote controller, said operation mode signal being generated from said remote controller.

5. An air-conditioner as set forth in claim 1, which further comprises temperature shift means for manually shifting said temperature correction value in dependency upon the state of a room subject to air-conditioning.

6. An air-conditioner in which a refrigerating cycle is operated so that a set temperature set by a wireless remote controller and a room temperature sensed by a temperature sensor attached at an indoor unit becomes equal to zero, said air-conditioner comprising:
    signal receiving means attached at said indoor unit, and adapted to receive an output signal from said wireless remote controller and to output a signal corresponding to a receiving direction,
    installation position discrimination means for discriminating an installation position of said indoor unit on the basis of an output from said signal receiving means, and
    temperature correction means for correcting said set temperature, said room temperature, or a difference therebetween by a temperature correction value for compensating a temperature difference which can exist between a temperature at a position to be mainly air-conditioned of a room and a temperature at the position where said indoor unit is installed in dependency upon an installation position discriminated by said installation position discrimination means.

7. An air-conditioner as set forth in claim 6, wherein said indoor unit is comprised of an indoor heat exchanger unit and a blower unit.

8. An air-conditioner as set forth in claim 6, wherein said temperature correction means includes a Table for determining said temperature correction value on the basis of an operation mode signal indicative of a cooling operation or a heating operation, and an output signal from said installation position confirmation means.

9. An air-conditioner as set forth in claim 8, wherein said temperature setter is included in said remote controller, said operation mode signal being generated from said remote controller.

10. An air-conditioner as set forth in claim 6, which further comprises temperature shift means for manually shifting said temperature correction value in dependency upon the state of a room subject to air-conditioning.

11. An air-conditioner as set forth in claim 6, wherein said signal receiving means includes at least three light receiving or photodetection elements which can receive or detect quantities of light different from each other in dependency upon an installation position of said indoor unit.

12. An air-conditioner as set forth in claim 11, wherein said installation position discrimination means comprises means for discriminating an element which has received or detected a maximum light quantity of said light receiving or photodetection element, means for taking statistical data indicating discriminated results as to how many number of times said respective light receiving or photodetection elements have received or detected a maximum light quantity, and means for discriminating an installation position of said indoor unit on the basis of said statistical data.

* * * * *